United States Patent Office 2,993,227
Patented July 25, 1961

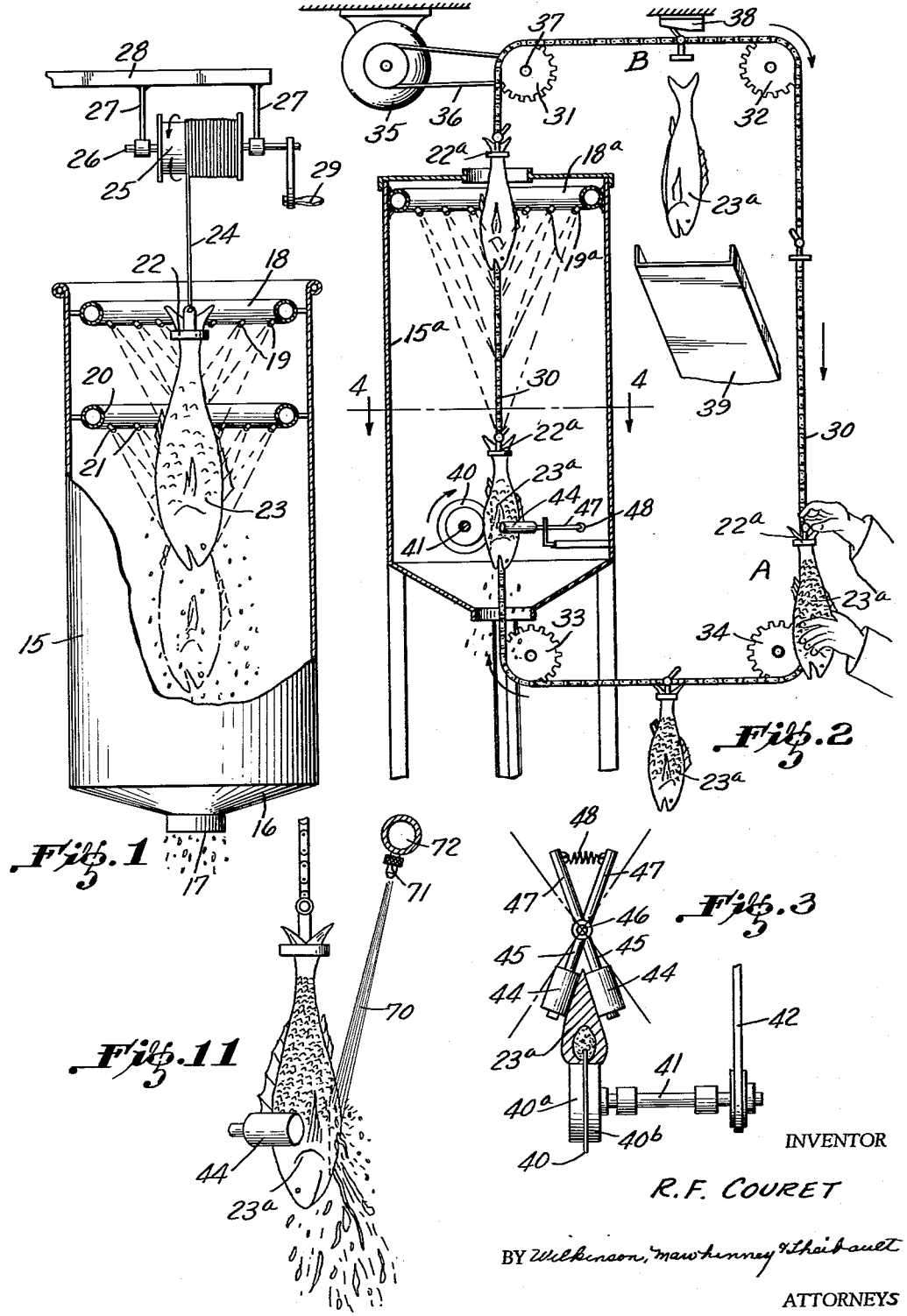

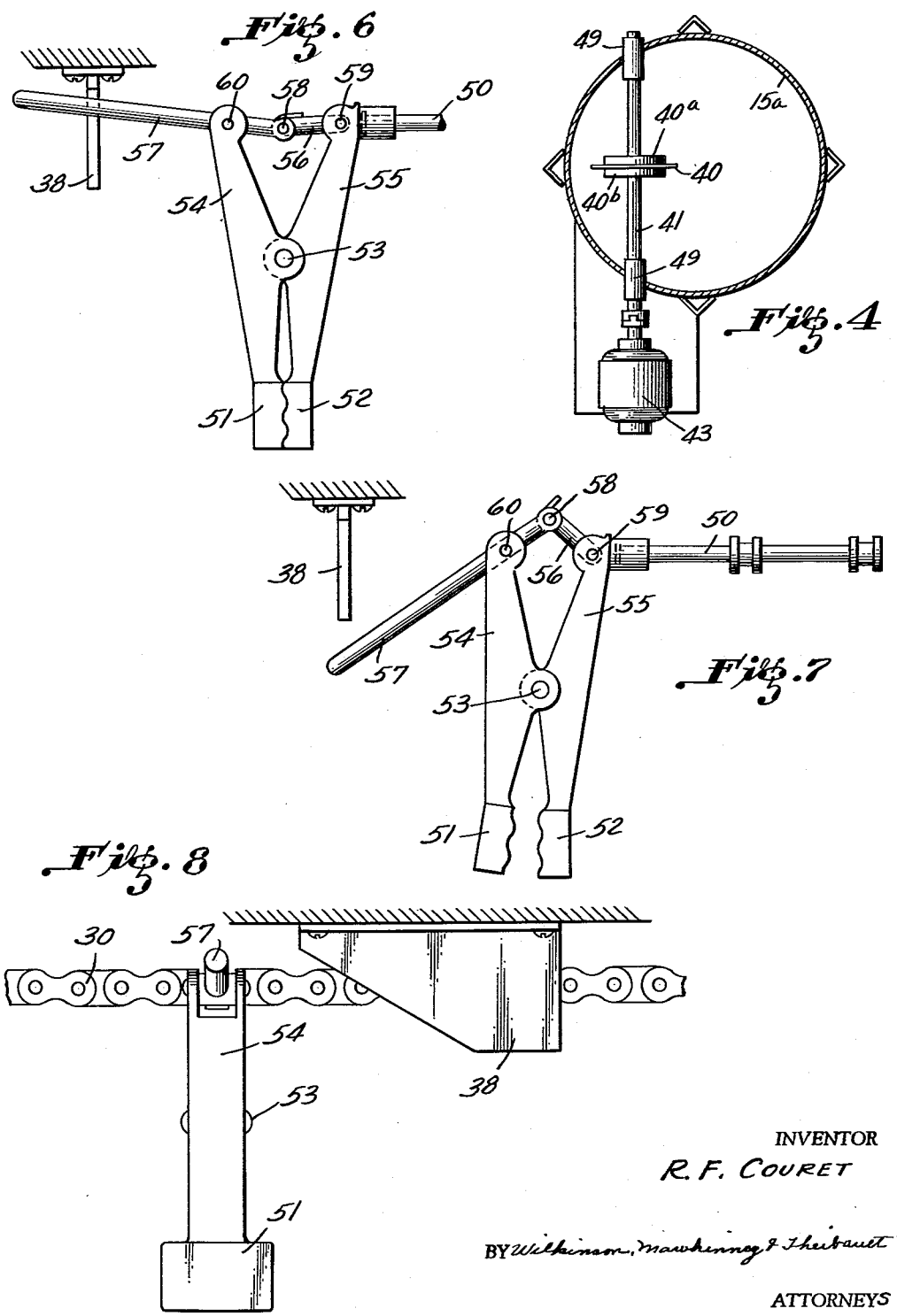

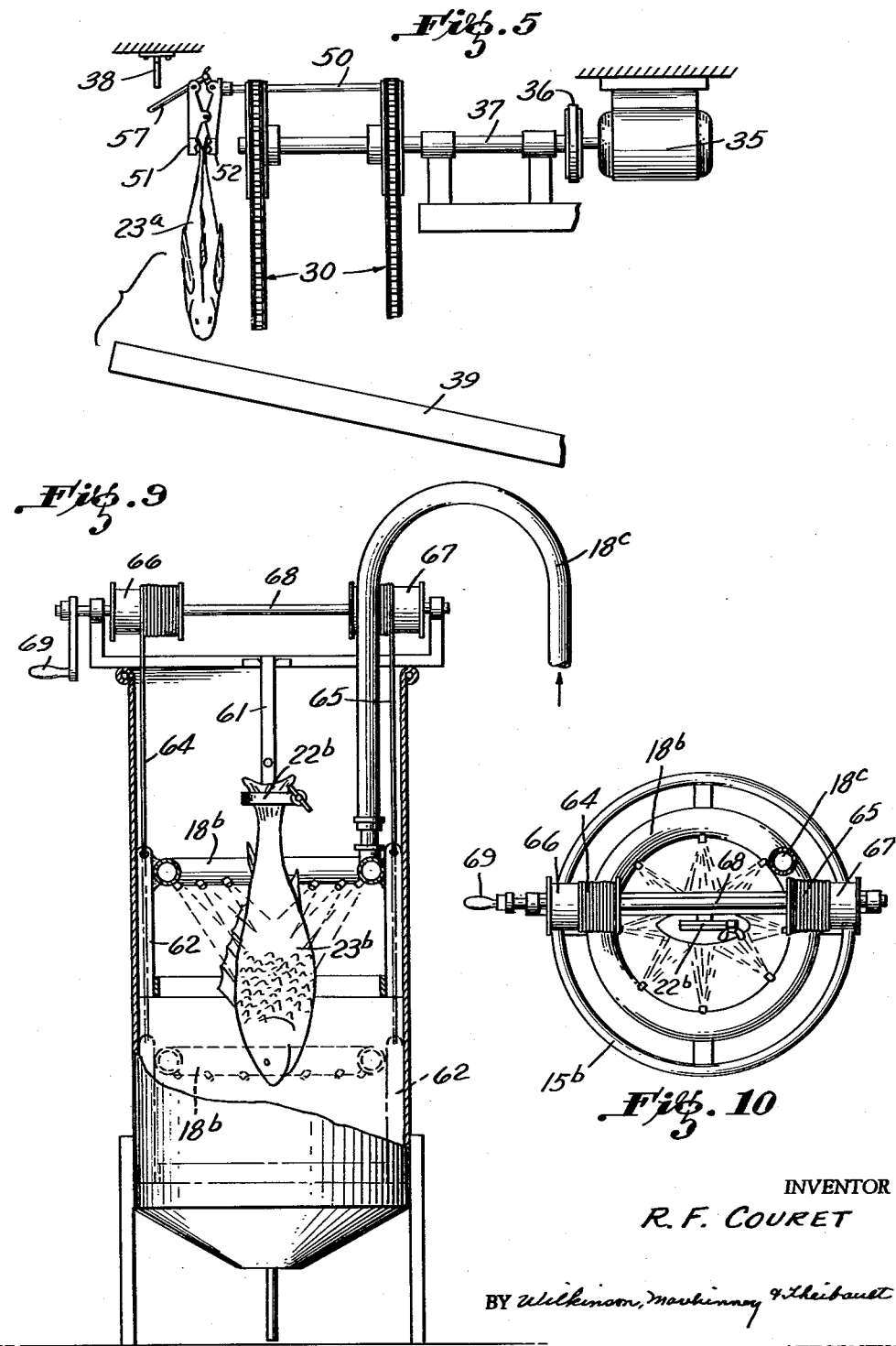

2,993,227
FISH CLEANING AND SCALING MACHINE
Robert F. Couret, 5964 Argonne St., New Orleans, La.
Filed Oct. 14, 1957, Ser. No. 689,923
8 Claims. (Cl. 17—3)

The present invention relates to fish scaler and process of scaling fish and has for an object to provide an apparatus and process that will remove the scales from fish and also the entrails by the use of fluid jets under high pressure.

Another object of the invention is to provide an apparatus and process for scaling fish and removing the entrails therefrom substantially instantaneously and with complete efficiency so that the fish is denuded of all scales and entrails without injury to the fish which thereby becomes a highly valuable article of commerce.

It is a further object of the invention to provide an apparatus and process for scaling fish in a continuous cycle with high volume capacity and at substantially reduced costs over prior apparatus and processes.

With the foregoing and other objects in view, the invention will be more fully described hereinafter, and will be more particulalry pointed out in the claims appended hereto.

In the drawings, wherein like symbols refer to like or corresponding parts throughout the several views.

FIGURE 1 is a side elevational view, with parts broken away and parts shown in section of an apparatus for scaling fish and illustrating one form of carrying out the process of this invention.

FIGURE 2 is a side elevational view of another form of apparatus with parts shown in section in which the process may be carried on in a continuous cycle.

FIGURE 3 is a plan view, with the fish shown in section of a form of fish slitting device and fish guiding means.

FIGURE 4 is a sectional view taken on an enlarged scale on the line 4—4 of FIGURE 2 illustrating a form of mounting for a rotary slitting knife in the housing and a form of driving connection thereto.

FIGURE 5 is an end elevational view of a portion of the chain or conveyor of FIGURE 2 showing a method of driving the same and a trip device for releasing the clamp which holds the fish to the conveyer.

FIGURE 6 is a side elevational view of a form of clamp employed, illustrated in the closed position in the path of a tripping device.

FIGURE 7 is a similar view showing the clamp as having been tripped and in the open position.

FIGURE 8 is a side elevational view of a form of cam trip or triggering mechanism for opening the clamp.

FIGURE 9 is a front elevational view, with parts broken away and parts shown in section of a modified form of the apparatus.

FIGURE 10 is a top plan view of the same.

FIGURE 11 is a front elevational view showing a modified form of fish slitting device.

Referring more particularly to FIGURE 1, 15 designates a housing or cylinder open at its top and having a hopper or other bottom 16 with a bottom opening 17 for the discharge of the scales.

Installed within the housing 15 is an upper pipe or manifold for containing water under pressure from a suitable source of supply, the manifold being preferably approximately circular and affixed in the upper portion of the housing 15 in any suitable manner. Depending from the manifold 18 are jet nozzles 19 directed inwardly and downwardly.

In like manner it is also preferred to provide a lower pipe or manifold 20, generally circular in form and having downwardly and inwardly directed jet nozzles 21.

A support 22 for the fish 23, which support may be in the form of a clamp is carried by a cable 24 which is wound upon a drum 25 mounted upon a shaft 26 journaled in hangers 27 which depend from a beam 28 or other support. The shaft 26 may be rotated by a clamp handle 29.

In the operation of this form of the device, the manifolds 18 and 20 being in communication with a source of fluid supply under pressure, for instance water, a fluid spray pattern will evolve converging on the fish 23 from all directions throughout the circle and will serve to blast off the scales of the fish since the jets are directed against the grain of the scales. The scales will descend through the bottom opening 17. The fish 23 is introduced downwardly through the open top of the housing 15, which latter serves to localize the action of the jets or sprays and to prevent the water or other jet fluid from overflowing upon adjacent areas.

The fish 23 may be moved up or down or both by means of the windlass so as to bring all parts of the fish into the spray zone of the jets, it being understood that one or more of the manifolds 18, 20 may be employed. As a matter of fact these manifolds may be employed in any appropriate number.

Referring more particularly to the form of apparatus illustrated in FIGURES 2, 3 and 4 of the drawings, 30 represents a conveyor which is trained about the rollers or sprockets 31, 32, 33 and 34 in which the sprocket 31 may be the drive sprocket, being driven from an electric or other motor 35 installed nearby to convenient point and connected by belt drive 36 to the drive shaft 37 of said drive sprocket 31.

The fish 23ª are attached by clamp 22ª or otherwise to the conveyor 30 and carried around therewith from a loading station A to and through the housing 15ª where the same are subjected to the action of jet scaling through the pressure from manifold 18ª and the nozzles 19ª to a discharge station B at which is located a trip 38 (FIG. 8) for releasing the fish 23ª to a discharge chute 39.

Within the housing 15ª is also preferably located a slitting device for slitting the belly of the fish 23ª to expose the entrails thereof. As more particularly appears from FIGURES 3 and 4, a form of such slitting device is constituted by a rotary slitter knife 40 mounted fast upon a shaft 41 to which is connected a belt drive as illustrated in FIGURE 3 or an electric motor 43 as shown in FIGURE 4. The shaft 41 is journaled in appropriate bearings 49 in the housing 15ª as shown in FIGURE 4. Associated with the circular rotary slitter knife 40 is an annular limiting ring or shoulder 40ª of lesser diameter than the diameter of the knife to control the depth of the cut. A second limit ring 40ᵇ may be added for symmetry and uniformity of penetration so that rings or shoulders are on both sides of the knife.

As also illustrated more particularly in FIGURES 2 and 3 a fish guide device is provided in conjunction with the slitting device in order to hold the fish up to the slitter and prevent its casually backing away from the same. One form of such guide device consists of a pair of guide rollers 44 adapted to engage in a divergent relation upon opposite sides of the back of the fish, such guide rollers being journaled on rods 45 pivoted at a substantially central point 46 and having their oppositely divergent tail pieces 47 connected together by a tension coil spring 48 which tends to pull the tail pieces 47 together and consequently squeezes the guide rollers 44 upon the back and sides of the fish 23ª.

It will be noted from FIGURE 2 that the conveyer 30 is disposed in a substantially rectangular arrangement as being a convenient form of arrangement of such chain, it being desirable that a vertical run be provided between the sprockets or rollers 31, 33 which will convey the fish 23ª upwardly through the housing 15ª past the slitting and guide devices and eventually up through the jet sprays for the purpose of scaling the fish and also driving the entrails therefrom which pass down through the bottom opening of the housing 15ª.

It will be understood that the chain 30 and/or slitter 40 may be driven continuously or intermittently. The slitter 40 is preferably driven at high speed.

Referring more particularly to FIGURE 5 it will be seen that the conveyer is preferably constituted of a pair of parallel chains 30 for stability and that the clamps 22ª are carried outboardly of the chains 30 so as to permit proper operation of the clamp and clamp tripping device 38. In this figure the clamps are shown as attached to the chains 30 by means of the central support rods 50.

A form of clamp suitable for holding the fish is illustrated in FIGURES 6, 7 and 8 and is of a clothespin variety.

In these figures clamp jaws 51 and 52 are shown as pivoted together at 53 and having their upwardly extending divergent shanks 54 and 55 connected together by a toggle lever in which 56 represents a short toggle link and 57 a long operating toggle link. These links 56 and 57 are connected together by the central toggle pivot 58. The short link 56 is pivoted at 59 to the shank 55 which may receive the support of the supporting rod 50. The longer operating link 57 is pivoted at 60 to the companion shank 54.

At station A as shown in FIGURE 2, the fish 23ª are attached manually or otherwise to the clamps, which clamps are in the open position as shown in FIGURE 7. The tail of the fish is simply inserted in the opening between the jaws 51 and 52 and the operator exerts an upward thrust between the long operating link 57 which causes the central pivot 58 to descend to the position of FIGURE 6 where such central pivot 58 is below a straight line between the pivots 59 and 60. Thus the toggle clamp is locked upon the flat tail of the fish and it will not release until after the fish has passed through the housing 15ᵇ on a vertically slidable frame 62 which is supported fluid jets. As the fish moves into the station B the long operating link 57 will encounter the trip 38. This trip 38, as illustrated in FIGURE 8, may be an inclined plane or cam surface which will cause the long operating link 57 to ride down the inclined surface to the position of FIGURE 7 thus breaking the toggle lever upwardly as indicated in this figure and opening the clamp jaws 51 and 52 to release the fish 23ª to the discharge chute 39.

Referring more particularly to that form of apparatus shown in FIGURES 9 and 10, in this instance the fish 23ᵇ is supported by a clamp 22ᵇ from a fixed support 61 in the housing 15ᵇ.

On the other hand the fluid jet manifold 18ᵇ is arranged for movement up and down vertically within the housing 15ᵇ on a vertically slidable frame 62 which is supported by the cables 64 and 65 wound about the winch drums 66 and 67 mounted upon a shaft 68 journaled at the upper portion of the apparatus. The shaft 68 and the drums 66 and 67 are arranged to be rotated in either direction by a crank handle 69 so that the cables may be wound up or played out to lift or lower the vertically slidable frame 62 and with it the fluid jet manifold 18ᵇ whereby to insure that the fluid jets may play upon all areas of the fish. FIGURE 9 shows in full and dotted lines the upper and lower positions of the manifold 18ᵇ and frame 62.

Referring more particularly to FIGURE 11, a jet stream 70 is shown as issuing from a jet nozzle 71 in communication with a fluid pressure manifold 72. This jet stream which may be an extremely strong jet of water or other fluid, in other words strong enough to cut the belly of the fish open and blast out the entrails, is directed to a point on the belly of the fish opposite to the guide device 44. This jet stream 70 will take place of the rotary slitting knife 40 of FIGURE 3.

Although I have disclosed herein the best form of the invention known to me at this time, I reserve the right to all such modifications and changes as may come within the scope of the following claims.

What is claimed is:

1. A fish cleaning machine comprising, a fish belly slitting means, fluid jet means for subjecting all sides of the fish substantially simultaneously to a fluid jet connected to a high pressure fluid supply positioned to one side of said slitting means, and a fish conveyor positioned to subject the fish first to the slitting means to open the belly area of the fish and to subject the fish to the fluid jet means where the scales and entrails are removed.

2. A fish cleaner as claimed in claim 1 wherein said fish conveyor is an endless conveyor having means to attach and release fish.

3. A fish cleaner as claimed in claim 1 in which said conveyor is an endless moving conveyor having releasable means to attach fish thereto, and means to automatically release the fish after cleaning.

4. A fish cleaner as claimed in claim 1 further comprising fish guide means substantially opposite the slitting means.

5. A fish cleaner as claimed in claim 1 further comprising a housing for localizing the jet action having openings for the introduction of the fish and for the evacuation of the removed scales and entrails.

6. A fish cleaner as claimed in claim 1 wherein said conveyor moves the fish into the slitting means and said jet means in a continuous cycle.

7. A fish cleaner as claimed in claim 1 wherein said fluid jet means is an annular jet ring.

8. A fish scaler as claimed in claim 1 in which said fluid jet means has a plurality of orifices arranged about the jet means in a generally circular central convergence pattern directed to converge on the fish from all sides as the fish and jet means are moved relatively to one another.

References Cited in the file of this patent

UNITED STATES PATENTS

| | | |
|---|---|---|
| 493,454 | Tobin | Mar. 14, 1893 |
| 745,861 | Keller et al. | Dec. 1, 1903 |
| 1,692,985 | Gallison | Nov. 27, 1928 |
| 1,935,149 | Elvin | Nov. 14, 1933 |
| 2,172,471 | Grow | Sept. 12, 1939 |
| 2,172,472 | Grow | Sept. 12, 1939 |
| 2,245,329 | Danielsson | June 10, 1941 |
| 2,412,338 | Jasper | Dec. 10, 1946 |
| 2,573,601 | Rathmell | Oct. 30, 1951 |